United States Patent [19]
Sevey

[11] Patent Number: 5,119,936
[45] Date of Patent: Jun. 9, 1992

[54] STRUCTURE AND METHOD FOR PROTECTIVELY ENCASING A LEVEL

[75] Inventor: Douglas L. Sevey, Waterloo, Iowa

[73] Assignee: Johnson Level and Tool Mfg. Co., Inc., Mequon, Wis.

[21] Appl. No.: 685,877

[22] Filed: Apr. 15, 1991

Related U.S. Application Data

[63] Continuation-in-part of Ser. No. 517,587, Apr. 30, 1990, abandoned.

[51] Int. Cl.$^5$ ............................................. B65D 85/30
[52] U.S. Cl. .................................... 206/349; 33/381; 206/583; 206/588; 220/8; 220/281
[58] Field of Search ............. 206/349, 583, 588, 590, 206/591, 525, 446; 220/8, 281; 229/93; 33/381, 382

[56] References Cited

U.S. PATENT DOCUMENTS

| | | |
|---|---|---|
| D. 293,044 | 12/1987 | Johnson . |
| 681,627 | 8/1901 | Cutting . |
| 1,316,870 | 9/1919 | Wacker ........................ 206/349 X |
| 1,326,885 | 12/1919 | Wales ............................... 220/281 |
| 1,587,258 | 6/1926 | Vogel ................................. 33/381 |
| 2,536,788 | 1/1951 | Vaida .................................. 33/381 |
| 2,538,424 | 1/1951 | Moehle . |
| 2,639,514 | 5/1953 | Garrison ........................ 53/381 X |
| 2,645,334 | 7/1953 | Aldridge ...................... 206/591 X |
| 3,280,969 | 10/1965 | Evans et al. ...................... 206/349 |
| 3,338,390 | 8/1967 | Gordon ........................ 206/591 X |
| 3,561,982 | 2/1971 | Oeth . |
| 3,664,495 | 5/1972 | Graham et al. ...................... 220/8 |
| 3,726,394 | 4/1973 | Wachter ...................... 206/525 X |
| 4,046,279 | 9/1977 | Rösler ......................... 206/349 X |
| 4,144,985 | 3/1979 | Kinslow . |
| 4,159,764 | 7/1979 | Schinke ...................... 206/583 X |
| 4,258,857 | 3/1981 | McGee ........................ 206/806 X |
| 4,493,433 | 1/1985 | Sideri et al. ................... 206/806 X |

FOREIGN PATENT DOCUMENTS 614018 12/1960 Italy .................................... 206/349

*Primary Examiner*—Bryon P. Gehman
*Attorney, Agent, or Firm*—Andrus, Sceales, Starke & Sawall

[57] ABSTRACT

A case for an elongated tool such as a level or the like includes outer walls which cooperate to define an internal cavity into which the tool is placed. Spaced indentations are provided along the length of the case, with the indentations extending around the entire periphery of the case. Each indentation provides a supporting surface adapted for placement closely adjacent an outer surface of the tool, for maintaining the tool out of contact with the outer walls of the case. An end cap encloses the open end of the case for securing the level therein, and indentations are formed in the end cap and in the end of the case for spacing the ends of the level inwardly from the end walls. The level is cushioned by an air space between the outer surfaces of the level and the inner surfaces of the outer walls.

7 Claims, 3 Drawing Sheets

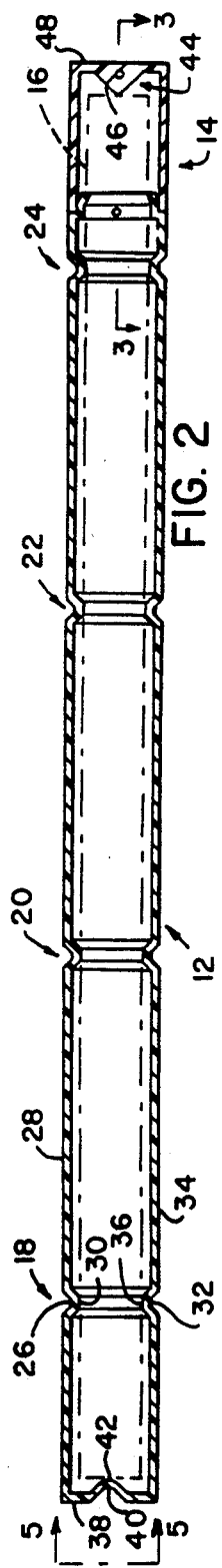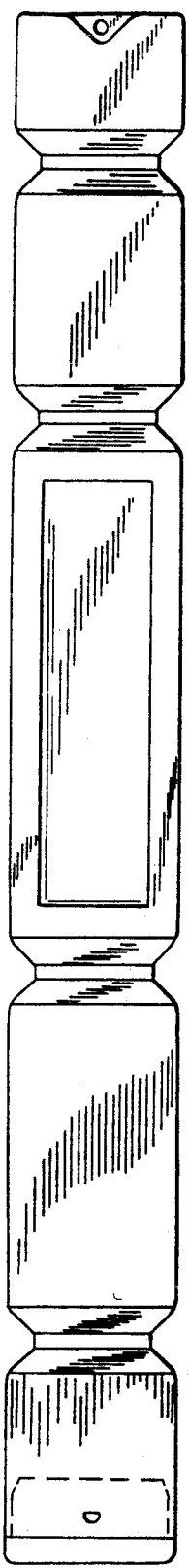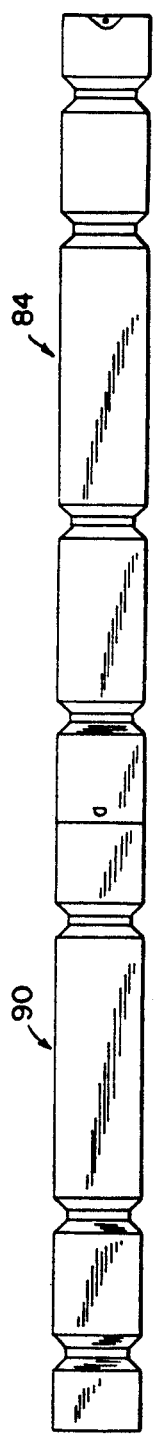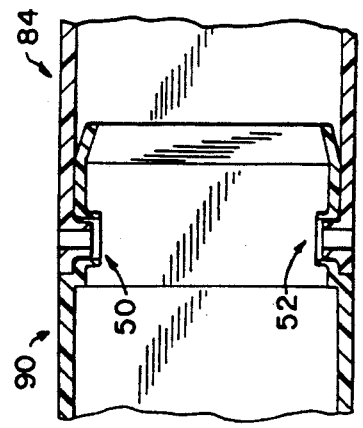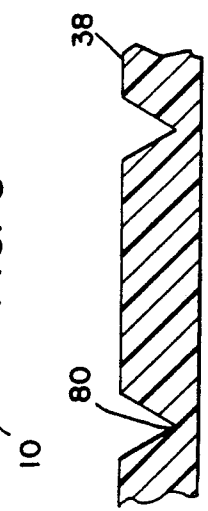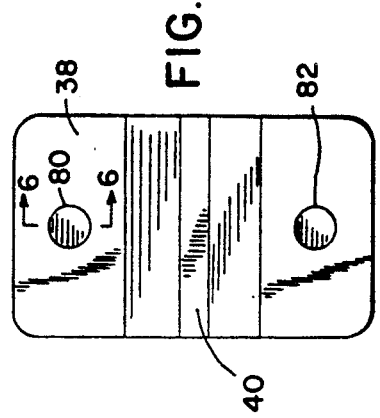

STRUCTURE AND METHOD FOR PROTECTIVELY ENCASING A LEVEL

CROSS-REFERENCE TO RELATED APPLICATIONS

This application is a continuation-in-part of application Ser. No. 07/517,587 filed Apr. 30, 1990, now abandoned.

BACKGROUND AND SUMMARY

This invention relates to tool cases such as for a level or the like, and more particularly to an improved level case incorporating features which protect the level during transport or handling.

Various tool case structures are known for encasing a level or the like when it is not in use. One such structure simply comprises an elongated tube having a closed end, with the level being received within the other end, which is normally open. A cap is placed over the open end of the tube after the level is received therein, for fully enclosing the level. This type of case is disclosed in U.S. Pat. No. Des. 293,444 owned by the same assignee as the present application.

It is an object of the present invention to provide an improved level case which includes features for cushioning and protecting the level during transport and handling. It is a further object of the invention to provide a level case including drainage features for removing moisture from the interior of the case, so as to prevent a wooden level from warping within the case over time. It is yet another object of the invention to provide a level case having cushioning and drainage features which is of simple and inexpensive construction.

In accordance with the invention, a structure for encasing an elongated tool such as a level or the like comprises a substantially tubular receptacle defined by outer walls which, when the level is placed in the receptacle, are spaced from the top, bottom and sides of the level throughout a majority of the length of the level. Level support means extends inwardly from the inner surfaces of the outer walls of the receptacle for supporting the level at two or more locations along its length, for maintaining the top, bottom and sides of the level in position within the receptacle and preventing movement of the level toward the receptacle outer walls.

In a preferred embodiment, the level support means comprises indentations formed in the receptacle outer walls which extend inwardly into the interior of the receptacle. The indentations are preferably formed around the periphery of the receptacle at two or more spaced locations. Each indentation defines an inner surface which, when the level is placed in the receptacle, is spaced only slightly from a surface of the level. With a rectangular level, the receptacle is defined by top, bottom and side walls, and an indentation is formed in each of the receptacle walls extending inwardly toward the level so as to be in close proximity to the top, bottom and sides of the level when the level is placed therein. In this manner, the level is supported by the inner surfaces of the indentations and maintained in position at a location spaced from the top, bottom, and side walls of the receptacle. An air space is disposed around the entire periphery of the level between the surfaces of the level and the receptable outer walls, throughout a majority of the length of the level, thus providing cushioning of the level during transport and handling. Alternatively, a cushioning material could be placed into the air space between the level and the receptacle walls, for providing additional cushioning of the level.

To remove moisture from the interior of the receptacle, drain holes are provided in an end of the receptacle and at other locations along its length to allow air circulation within the interior of the receptacle. In this manner, moisture which may be present within the interior of the receptacle can drain out of the receptacle or otherwise evaporate due to air circulation therein.

Various other objects and features of the invention will be made apparent from the following description of the preferred embodiment of the invention taken in combination with the drawings.

BRIEF DESCRIPTION OF THE DRAWINGS

The drawings illustrate the best mode presently contemplated of carrying out the invention.

In the drawings:

FIG. 2 is a longitudinal sectional view through the level case illustrated in FIG. 1;

FIG. 5 is an end view of the level case of the invention, reference being made to line 5—5 of FIG. 2;

FIG. 6 is a partial sectional view taken generally along line 6—6 of FIG. 5;

FIG. 7 is a front elevation view of an alternative embodiment of the level case of the invention, showing a base module for housing a short level;

FIG. 8 is a front elevation view of a level case constructed according to the invention, and incorporating the base module of FIG. 7 and an extension module for housing a longer level;

FIG. 9 is a partial sectional view of the assembly of FIG. 8, showing interconnection of the base module with the extension module.

DETAILED DESCRIPTION OF THE PREFERRED EMBODIMENT

Figure 1:
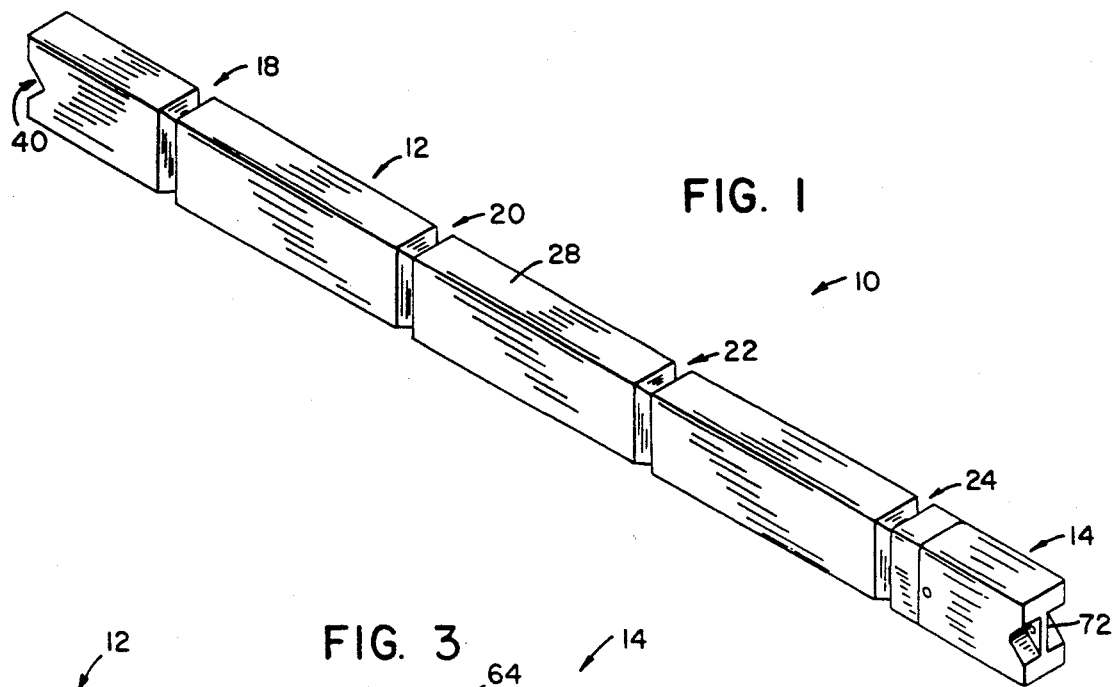
FIG. 1 is an isometric view of a level case constructed according to the invention.

As shown in FIG. 1, a level case 10 generally includes a receptacle body 12 and an end cap 14. Body 12 is generally in the form of a closed-end tubular member defined by upper and lower spaced parallel walls and right and left spaced parallel side walls, defining a generally rectangular cross-section. End cap 14 is similarly constructed. Body 12 and end cap 14 are preferably constructed of a material such as high density polyethylene, having a wall thickness of approximately 0.060 inches.

Referring the FIG. 2, a level, shown in phantom at 16, is adapted for placement into the open end of receptacle body 12 when cap 14 is removed. Placement of end cap 14 into position at the end of receptacle body 12 encases level 16 for protection during transport, handling and otherwise when not in use.

At locations along the length of body portion 12, denoted at 18, 20, 22 and 24, each wall of body portion 12 is provided with an inwardly extending indentation.

At each of locations 18–24, the indentations extend across the entire transverse dimension of the wall in which the indentation is formed, providing an inwardly extending area around the entire periphery of body 12 at locations 18–24. Accordingly, the indentations at locations 18–24 act to divide body 12 into a series of segments extending between indentations.

The indentations formed at locations 18–24 are identical to each other. Referring to FIG. 2 at location 18, an indentation 26 formed in upper wall 28 of body 12 defines an inner supporting surface 30 spaced inwardly from the inner surface of upper wall 28. In a similar manner, an indentation 32 formed in the lower wall 34 of body portion 12 defines a supporting surface 36 spaced inwardly from the inner surface of lower wall 34. Supporting surfaces 30, 36 are spaced from and face each other, providing a transverse opening therebetween sufficient to receive the height of level 16 therebetween.

The side walls of body portion 12 are provided with indentations similar to indentations 26, 32 described above. The indentations define inner supporting surfaces, spaced from and facing each other, with the space therebetween being sufficient to receive the width of level 16 therebetween.

Each of locations 20, 22 and 24 are provided with indentations similar to those described above with respect to location 18. In this manner, when level 16 is inserted into the interior of body 12 through its open end, the top, bottom and sides of the level are spaced closely adjacent to a supporting surface defined by indentations at locations 18–24.

The end wall of body 12, shown at 38, is also provided with an indentation 40 extending across its entire width. Indentation 40 defines a supporting surface 42 spaced inwardly from the inner surface of end wall 38, which is adapted to engage the end of level 16 when level 16 is placed into body 12.

With the arrangement as shown and described level 16 is supported at spaced points along its length by the inwardly facing supporting surfaces provided by the indentations formed at locations 18–24, and is supported at its inner end by end supporting surface 42. Level 16 is essentially "suspended" in the interior of body 12, with the majority of the length of the top, bottom and sides of the level being spaced inwardly from the inner surfaces of the top, bottom and sides of body 12. The level is thus protected by the air space located between the outer surfaces of the level and the inner surfaces of the top, bottom and side walls of body 12. In the event the walls of body 12 are subjected to bumps or other outside forces during storage and handling, level 16 is cushioned from their effects by the air space between the outer surfaces of level 16 and the inner surfaces of the walls of body 12.

End cap 14 is constructed so as to provide an inwardly extending indentation 44 defining an inner supporting surface 46 spaced inwardly from the inner surface of end wall 48. When end cap 14 is engaged with and in place on body portion 12, in a manner to be explained, supporting surface 46 is disposed closely adjacent the end of level 16 for providing cushioning thereto in a manner similar to that described above.

Figure 3:
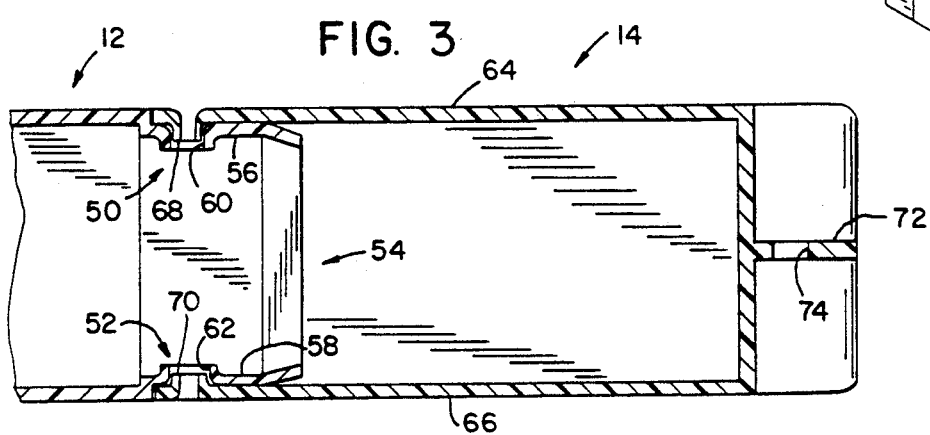
FIG. 3 is an enlarged partial sectional view taken generally along line 3—3 of FIG. 2.

Referring now to FIG. 3, end cap 14 is connected to the end of body portion 12 by a releasable engagement system, shown at 50, 52, between body 12 and end cap 14 on either side thereof. Body 12 includes a reduced end portion 54 defined by top, bottom, and side walls formed integrally with but spaced inwardly from the top, bottom and side walls defining the remainder of the length of body 12. Side walls 56, 58 are each provided with an opening 60, 62, respectively. Openings 60, 62 flare outwardly at the outer surfaces of side walls 56, 58, respectively, providing a gradual transition into openings 60, 62. Each side wall in reduced end portion 54 is also provided with an inwardly extending end, defining a ramped entrance onto end portion 54.

The side walls 64, 66 of end cap 14 are provided toward their ends with inwardly extending projections 68, 70. Projections 68, 70 are formed so as to provide a snap-in fit into openings 60, 62 in reduced portion side walls 56, 58 upon movement of end cap 14 over end portion 54. In this manner, end cap 14 is secured to body 12. When it is desired to remove level 16 from the interior of body 12, an axial pull-off force is exerted on end cap 14 to dislodge projections 68, 70 from openings 60, 62, by projections 68, 70 riding out of openings 60, 62 on the flared outer areas of openings 60, 62. Side walls 56, 58 are deformed inwardly by projections 68, 70, to allow end cap 14 to be removed from body portion 12. This exposes the end of level 16, which can then be drawn out of body portion 12.

End cap side walls 64, 66 are preferably bowed inwardly toward their center portion. In this manner, side walls 64, 66 flex outwardly during push-on engagement with end portion 54, providing reinforcement to the connection of end cap 14 to end portion 54.

Exteriorly of indentation 44 formed in the end of end cap 14, a wall 72 is provided with an opening 74. With this arrangement, the hook of a display assembly can be passed through opening 74 to hang level case 10 therefrom, or the same arrangement can be used for storing level case 10 with the level 16 received therein after purchase during periods of non-use.

Figure 4:
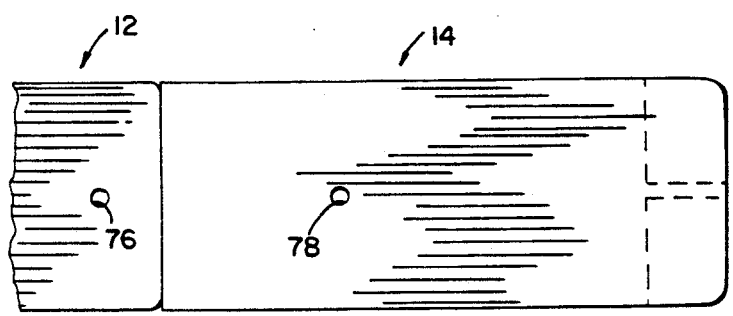
FIG. 4 is an enlarged partial bottom plan view of the right end portion of the level case as illustrated in FIGS. 1 and 2.

FIG. 4 illustrates a pair of openings 76, 78, provided in the end of body portion 12 and in end cap 14, respectively. Openings 76, 78 are adapted to receive an elongated flexible strap or other satisfactory connector, which secures end cap 14 to body portion 12 when end cap 14 is removed therefrom to expose the open end of body portion 12. In this manner, end cap 14 cannot be misplaced from body portion 12, and is readily available when it is again desired to encase level 16 within level case 10.

Referring to FIG. 5, end wall 38 of body portion 12 is provided with a pair of round scored areas shown at 80, 82, provided one on either side of indentation 40 formed in end wall 38. If desired, the circular knock-out defined by scores 80, 82 can be removed by a user for providing air circulation into the interior of level case 10, or for draining liquids therefrom. This facilitates maintaining level 16 dry and thus avoiding warpage. Knock-outs or openings may be formed at other locations in body 12 or end cap 14 to provide additional drainage and air circulation.

FIGS. 7, 8 and 9 illustrate an alternative construction for a level case 10. Referring to FIG. 7, the level case is defined by a base module 84 constructed in a manner similar to that described above with reference to body portion 12, providing a series of indentations along its length and an indentation in the end wall thereof. Base module 84 is again in the form of a tubular member having a closed end and an open end. A pair of openings, one of which is shown at 88, extend through inwardly extending projections formed in base module 84 near its open end. An end cap 86 is provided with a reduced end portion engagement system similar to that shown and described in FIG. 3 at end 54, providing a system for removably securing end cap 86 to base module 84. Base module 84 is of a length sufficient to receive a relatively short level therein. Many manufacturers make and sell a level having a length of approximately two feet, which can be received within and encased by base module 84 in combination with end cap 86. If desired, end cap 86 may be provided with a cushioning indentation in a manner similar to that described in connection with indentation 44 formed in end wall 48 of body portion 14, shown in FIG. 2, to provide additional cushioning features.

With reference to FIG. 8, base module 84 is shown as the leftward end of a longer level case, having a length sufficient to receive a level of approximately four feet therein. To accomplish this, an extension module 90 is employed to encase the remainder of the length of the level received within base module 84. Extension module 90 is also in the form of a tubular member having one open end and one closed end, and has a length nearly identical to that of base module 84. An indentation is preferably provided in the end wall of extension module 94 providing the cushioning features described above. As shown in FIG. 9, a reduced end portion is formed adjacent the open end of extension module 90, having openings which receive the inwardly extending projections formed toward the open end of base module 84, providing removable engagement of extension module 90 with base module 84 in a manner similar to that described above. The removable engagement system between base module 84 and extension module 90 is again shown at 50, 52. With this arrangement, base module 84 can be employed in combination with extension module 90 to fully encase a longer level, such as one having a length of approximately four feet.

Figure 10:
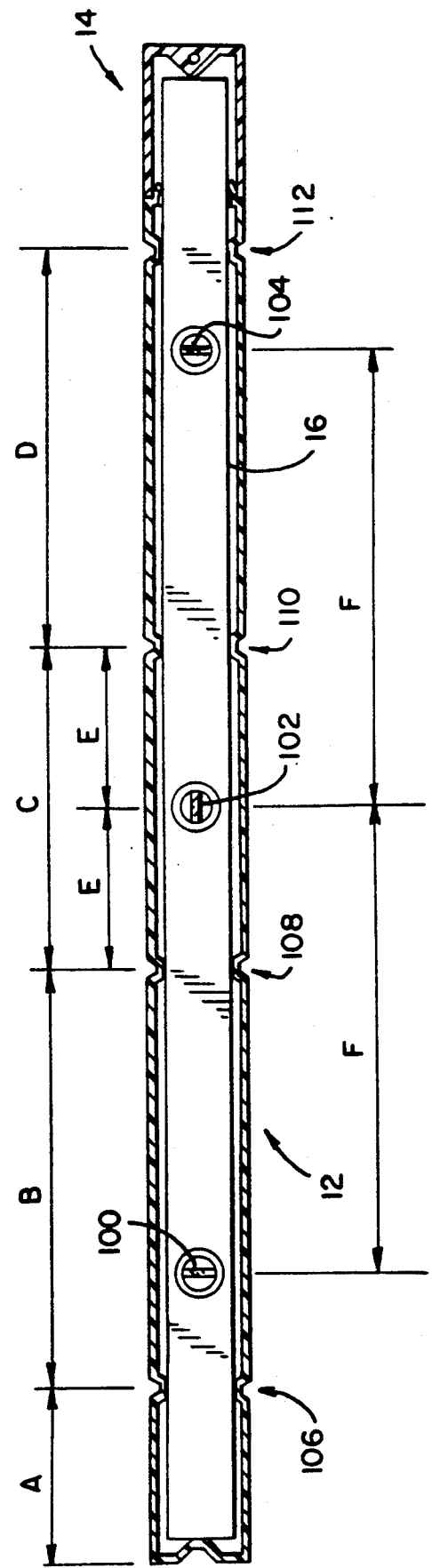
FIG. 10 is a longitudinal sectional view similar to FIG. 2, showing placement of a level within the level case of the invention.

FIG. 10 illustrates level 16 contained within the interior of the level case, which consists of body 12 and end cap 14. Level 16 as illustrated is in the form of a wood level in which three spaced openings are formed. Level or plumb vials, such as shown at 100, 102 and 104, are mounted within the openings as is known in the art. Body 12 of level case 10 is provided with four circumferential indentations, shown generally at 106, 108, 110 and 112. Level 16 may have a length such as 48 inches, which is conventional in the art, and the distance F between vials 100, 102 and 102, 104 for a 48 inch level is approximately 15". Distance E between central vial 102 and indentations 108, 110 is approximately 6", making distance C between indentations 108, 110 approximately 12". Distance B between indentations 106, 108 is approximately 12", as is distance B between indentations 110, 112. Distance A, from the end of body portion 12 to indentation 106, is approximately 6". Indentations 106 and 112 are thus located so as to engage level 16 at approximately 67% of the distance between the ends of level 16 and vials 100, 104. Indentations 108, 110 engage level 16 at approximately 40% of the distance between vial 102 and vials 100, 104, respectively.

With the placement of indentations 106-112 as shown and described, vials 100, 102 and 104 are well insulated from experiencing the effects of any forces resulting from dropping, bumping or otherwise handling level case 10 when level 16 is contained therewithin. In addition, indentations 106-112 are close enough to vials 100-104 to prevent the material of body portion 16 from deflecting inwardly into contact with level 16 unless body portion 16 is subjected to a severe blow.

The indentations, such as 106-112 are similarly located with other lengths of level 16, so as not to be in alignment with the level vials when the level is contained within the case.

Various alternatives and embodiments are contemplated as being within the scope of the following claims particularly pointing out and distinctly claiming the subject matter regarded as the invention.

I claim:

1. A level and case combination, comprising:
   a level having two or more vials; and
   a case for containing the level when the level is not is use, comprising:
   a body portion extending along a longitudinal axis and including one or more outer walls defining an internal cavity adapted to receive a portion of the length of the level therewithin, the body portion having an end wall at one end of the internal cavity and having an open end opposite the end wall for accommodating placement of the level within the internal cavity;
   first support structure extending inwardly from the one or more outer walls of the body portion into the internal cavity defined by the one or more outer walls, wherein the first support structure includes inner supporting surfaces which define a passage through which the level extends, and wherein the inner supporting surfaces define a cross-section corresponding to that of the level and directly engage the level at various locations about the periphery of the level to maintain the level out of contact with the one or more outer walls of the body portion, wherein the inner supporting surfaces engage the level at a location between the two or more vials;
   second support structure extending into the internal cavity from the body portion end wall to maintain the end of the level adjacent thereto out of contact with the end wall; a cap member releasably engageable with the body portion at its open end for fully enclosing the level, the cap member including an end wall; and
   third support structure extending inwardly from the cap member end wall to maintain the end of the level adjacent thereto out of contact with the cap member end wall when the cap member is engaged with the body portion at its open end.

2. The combination of claim 1, wherein the third support structure extending inwardly from the one or more body portion outer walls comprises a plurality of spaced transverse indentations formed in the body portion outer walls and extending inwardly into the internal cavity defined thereby.

3. The combination of claim 2, wherein the level includes a pair of end vials and a center vial, and wherein a pair of indentations are located one on each side of the center vial and are spaced from the center vial approximately 40% of the distance between the center vial and each end vial.

4. The combination of claim 1, wherein the cap member is releasably engageable with the body portion by means by a releasable retainer system including:
   a projection formed on one of the cap member or the body portion; and
   a recess formed on the other of the cap member or the body portion;
   wherein push-on engagement of the cap member with the open end of the body portion in a direction in line with the longitudinal axis of the body portion causes engagement of the end of the projection with the portion of the cap member or body portion adjacent the recess, to deflect said portion in a direction transverse to the body portion longitudinal axis, thereby allowing engagement of the projection with the recess to secure the cap member to the body portion, and wherein application of a pull-off force to the cap member causes disengagement of the projection from the recess upon deflection of said portion in a direction transverse to the body portion longitudinal axis.

5. The combination of claim 1, wherein the third support structure extending inwardly from the cap member end wall comprises an inwardly extending indentation formed in the cap member end wall for engaging the end of the level, and wherein the indentation defines an external recess, and further comprising a wall located in the external recess and having an opening adapted to receive a hook for storage or display.

6. The combination of claim 1, wherein the one or more walls of the body portion define a non-circular external shape adjacent the open end of the body portion, and wherein the cap member has a non-circular internal shape corresponding to the non-circular external shape of the body portion, for providing non-rotatable mating engagement of the cap member with the body portion.

7. A method of protecting a level when it is not in use, the level having two or more spaced vials, comprising the steps of:

providing a case, comprising a body portion extending along a longitudinal axis and including one or more outer walls defining an internal cavity adapted to receive a portion of the length of the level therewithin, the body portion further including an end wall at one end of the internal cavity and having an open end opposite the end wall for accommodating placement of the level within the internal cavity; first support structure extending inwardly from the one or more outer walls of the body portion into the internal cavity defined by the one or more outer walls, wherein the first supporting structure includes inner supporting surfaces which define a passage adapted to receive the level, and wherein the inner supporting surfaces define a cross-section corresponding to that of the level and directly engage the level at various locations about the periphery of the level to maintain the level out of contact with the one or more outer walls of the body portion, wherein the inner supporting surfaces engage the level at a location between the two or more vials; and second support structure extending into the internal cavity from the body portion end wall to maintain a first end of the level out of contact with the end wall;

providing a cap member releasably engageable with the body portion at its open end for fully enclosing the level, the cap member including an end wall, and third support structure extending inwardly from the cap member end wall to maintain the end of the level adjacent thereto out of contact with the cap member end wall;

inserting the level into the internal cavity through the open end of the body portion such that an end of the level engages the second support structure and the level is maintined out of contact with the body portion outer walls by the first support structure; and engaging the cap member with the body portion adjacent its open end to maintain the level within the body portion internal cavity, whereby the third support structure engages a second end of the level to maintain it out of engagement with the cap member end wall.

* * * * *